United States Patent [19]
Matsui et al.

[11] Patent Number: 5,094,924
[45] Date of Patent: Mar. 10, 1992

[54] POLYESTER RESIN FILM LAMINATED STEEL SHEET FOR DRAWN AND IRONED CAN

[76] Inventors: Kenzo Matsui, 930-5, Usanagi Hiraocho, Kumage-gun, Yamaguchi-ken; Yasuhiko Nakagawa, 486-1, Kaminakasone Shutocho, Kuga-gun, Yamaguchi-ken; Atsuo Tanaka, 5-2, Enomiyacho, Tokuyama-shi, Yamaguchi-ken; Tsuneo Inui, 7417-6, Nishikitayama, Tokuyama-shi, Yamaguchi-ken, all of Japan

[21] Appl. No.: 531,622

[22] Filed: Jun. 1, 1990

Related U.S. Application Data

[63] Continuation-in-part of Ser. No. 259,705, Oct. 19, 1988, abandoned.

[51] Int. Cl.$^5$ ............................................. B32B 15/08
[52] U.S. Cl. ...................................... 428/623; 428/626; 428/632; 428/648
[58] Field of Search ............... 428/632, 626, 648, 622, 428/623

[56] References Cited

U.S. PATENT DOCUMENTS

| | | | |
|---|---|---|---|
| 3,160,481 | 12/1964 | Shoemaker | 428/648 |
| 3,245,577 | 4/1966 | Virzi | 428/626 |
| 3,260,580 | 7/1966 | Kamm et al. | 428/648 |
| 3,655,349 | 4/1972 | Shah | 428/648 |
| 3,671,205 | 6/1972 | Uchida et al. | 428/626 |
| 3,799,750 | 3/1974 | Bird | 428/632 |
| 3,978,803 | 9/1976 | Asano et al. | 428/626 |
| 4,125,670 | 11/1978 | Perfetti et al. | 428/626 |
| 4,177,323 | 12/1979 | Obi et al. | 428/626 |
| 4,517,255 | 5/1985 | Kanda et al. | 428/626 |
| 4,578,319 | 3/1986 | Shimizu et al. | 428/632 |
| 4,686,152 | 8/1987 | Matsubayashi et al. | 428/648 |
| 4,863,060 | 9/1989 | Saunders | 428/632 |
| 4,945,008 | 7/1990 | Heyes | 428/626 |

FOREIGN PATENT DOCUMENTS

| | | | |
|---|---|---|---|
| 58-22341 | 2/1983 | Japan | 428/648 |
| 59-145794 | 8/1984 | Japan | 428/632 |
| 61-139675 | 6/1986 | Japan | 428/632 |
| 1-136738 | 5/1989 | Japan | 428/648 |
| 1-192544 | 8/1989 | Japan | 428/626 |
| 8903303 | 4/1989 | PCT Int'l Appl. | 428/626 |

*Primary Examiner*—John J. Zimmerman

[57] ABSTRACT

A polyester resin film laminated steel sheet for a drawn and ironed can which comprises laminating a copolyester resin film prepared by processing according to a known method on the one side of a steel sheet covered with at least hydrated chromium oxide to be employed for the inside of the drawn and ironed can and plating tin on the other side of the steel sheet to be employed for the outside of the drawn and ironed can.

By using this polyester resin film laminated steel sheet, a drawn and ironed can having an excellent corrosion resistance with respect to the packed contents such as carbonated beverages and fruit juices is easily produced. Furthermore, this drawn and ironed can can be used without an inner lacquer coating after forming.

5 Claims, No Drawings

POLYESTER RESIN FILM LAMINATED STEEL SHEET FOR DRAWN AND IRONED CAN

This is a Continuation-In-Part of Ser. No. 07/259,705 filed Oct. 19, 1988 now abandoned.

FIELD OF THE INVENTION

The present invention relates to a polyester resin film laminated steel sheet for a drawn and ironed can (DI can). In detail, the polyester resin film laminated steel sheet comprises laminating a copolyester resin film on the one side of the steel sheet to be employed for the inside of the DI can and plating a ductile metal on the other side of the steel sheet to be employed for the outside of the DI can.

BACKGROUND AND OBJECTIVE

At present, tinplated steel sheet, namely tinplate and aluminum sheet is widely used as a material for DI cans for carbonated beverages and beer. These DI cans are produced by the following process: cutting to a circular blank → drawing → redrawing → ironing several times → washing the coolant oil used for forming → surface treatment of the formed can by phosphate or zirconium salt → rinsing with water → drying → spray coating of lacquer on the inside of the formed can → color printing the outside of the formed can.

The production cost of the DI can is expensive because the production process of the DI can is complex as described above.

Recently, a resin film laminated metal sheet has been investigated to be used for a drawn and redrawn can (DRD can) and DI can with a view to eliminating the coating of lacquer on the inside of those cans, which coating takes a fair part of the can cost.

For example, a metal sheet covered with polyester resin film (U.S. Pat. No. 4,517,255) has been employed to be formed into a DRD can.

The forming process for the DRD can consists of two step drawing: drawing and redrawing. The drawing process does not involve the reduction of the can wall thickness, so the DRD process is used for forming a rather short height can.

On the other hand, the forming process for a DI can consists of two forming processes: drawing and ironing, as mentioned earlier. Under the drawing process, the metal sheet is formed into a shallow cup. This process is fundamentally the same drawing process as the DRD process. Under the following ironing process, the drawn cup is redrawn at first, then the thickness of the redrawn cup wall is successively reduced into about a third of the thickness of the original metal sheet by a several step ironing. (Redrawing and ironing are jointly performed.)

As mentioned above, since the DI process involves the reduction of the can wall thickness in order to form a thin wall and tall height can, more formability of material, higher ductility of laminated polyester resin film in particular, excellent adhesion of the polyester resin film to the metal sheet and excellent lubricating capacity of the surface to become the outside of a can are jointly required for the material used for a DI can compared to that for a DRD can.

The metal sheet covered with polyester resin film shown in U.S. Pat. No. 4,517,255 can be formed into a DRD can having excellent adhesion of the resin film to the metal sheet without any film damage, but can not be continuously formed into a DI can because of lacking in the lubricating capacity of the side of the metal sheet to become the outside of a can, and in addition, many cracks are generated in the film of the formed DI can.

For another example, polyester resin film laminated steel sheet (Laid-Open Japanese Patent Application No. SHO. 60-168643) has been employed for a DI can.

The characteristics of DI cans produced from a polyethylene terephthalate film laminated steel sheet shown in Laid-Open Japanese Patent Application No. Sho. 60-168643 deteriorate remarkably by reheating upon curing the color printing ink applied on the outside of the formed DI can. Namely, much filiform corrosion arises from the edge of DI cans reheated for curing the color printing ink during long storage in an atmosphere having high humidity and high temperature.

It is assumed that the cause of filiform corrosion is due to the deterioration of the adhesion of polyethylene terephthalate film to the steel sheet by recrystallization of polyethylene terephthalate film during reheating at above 160° C., although the structure of polyethylene terephthalate film may change to the monoaxial oriented state from the amorphous non-oriented state by ironing.

Accordingly, it is the first objective of the present invention to provide a copolyester resin film laminated steel sheet or strip as a material for DI cans having excellent adhesion of the copolyester resin film to the steel sheet after forming into DI cans, excellent corrosion resistance which can be used without an inner lacquer coating after forming of DI cans and excellent external appearance after forming into DI cans.

It is the second objective of the present invention to provide a production method for a material for DI cans having excellent filiform corrosion resistance in the formed part after reheating at the temperature of 160° to 200° C..

BRIEF DESCRIPTION OF THE INVENTION

The first objective of the present invention can be accomplished by the continuous lamination of a copolyester resin film produced from 75 to 95 mole % of polyethylene terephthalate and 5 to 25 mole % of other polyester resin on the one side of the steel sheet having at least hydrated chromium oxide and the deposition of ductile tin on the other side of the steel sheet.

The second objective of the present invention can be accomplished by the following two methods. The first method is one in which the copolyester resin film precoated with a small amount of resin composite is laminated on the one side of the steel sheet heated to a melting temperature of copolyester resin film ±50° C.. The second method is one in which said copolyester resin film is directly laminated on the one side of the steel sheet heated to a melting temperature of said copolyester resin film ±50° C..

The present invention is characterized by the use of the special copolyester resin film having an excellent formability and excellent corrosion resistance described above, in addition to the use of the steel sheet in which the one side is covered with at least hydrated chromium oxide and the other side is plated with ductile tin. In the present invention, the presence of a hydrated chromium oxide and ductile tin layer on each side of the steel sheet are indispensable in order to obtain excellent adhesion to the copolyester resin film and excellent formability into a DI can.

The copolyester resin film laminated steel sheet according to the present invention can be also used as a material for drawn cans, drawn and redrawn cans, drawn and thin redrawn cans and can ends.

DETAILED DESCRIPTION OF THE INVENTION

In the present invention, the copolyester resin film applied on the inside of the DI can is prepared by processing according to a known method, a copolyester resin which is composed of 75 to 95 mole % of polyethylene terephthalate and 5 to 25 mole % of a polyester resin produced by the esterification of at least one saturated polycarboxylic acid with at least one saturated polyalcohol.

In the present invention, the use of copolyester resin film having a biaxial oriented structure is especially desirable from the viewpoint of corrosion resistance, although non-oriented copolyester resin film can be also used.

The thickness of the copolyester resin film used in the present invention should be 10 to 50 μm, preferably 10 to 30 μm. If the thickness of the employed copolyester resin film is below 10 μm, many cracks are observed in the copolyester resin film laminated on the steel sheet according to the present invention after forming into the DI can and the continuous lamination of thin copolyester resin film to the steel sheet at high speed becomes remarkably difficult. Moreover, use of a copolyester resin film above 50 μm is not economically suitable for the film to be laminated to the steel sheet, because the copolyester resin film used for the present invention is expensive as compared with lacquers widely used in the can industry.

In the present invention, the softening temperature and the melting temperature of the employed copolyester resin film are also important factors. The softening temperature is defined as the temperature at which the insertion of the needle into the copolyester resin film starts at a heating rate of 10° C./min. in the thermal mechanical analyzer. (TMA 100 made by Seiko Denshi Kogyo Co.) The melting temperature is defined as the temperature at which the endothermic peak is obtained at a heating rate of 10° C./min. in the differential scanning calorimeter. (SS10 made by Seiko Denshi Kogyo Co.)

In the present invention, the copolyester resin film having a 170 to 235° C. softening temperature and a 190 to 250° C. melting temperature should be used. The copolyester resin film having the softening temperature of above 235° C. becomes poor in formability and bonding strength to the steel sheet because the copolyester resin film is easily crystallized by reheating to cure the color printing ink subjected to the outside of the DI can. On the other hand, if the copolyester resin film having a softening temperature below 170° C. is used, the efficiency in the production process of the DI can becomes remarkably poor because the copolyester film becomes soft by reheating to cure the color printing ink applied to the outside of the DI can at a higher temperature than the softening temperature of the copolyester resin film.

The use of the copolyester resin film having a melting temperature above 250° C. is not suitable in the present invention because this copolyester film is rigid and is poor in formability.

If the copolyester resin film having a melting temperature below 190° C. is applied to the steel sheet for the DI can according to the present invention, many cracks may be observed in the laminated copolyester resin film after flanging and necking the DI can because the mechanical strength of this copolyester resin film becomes remarkably poor by reheating to cure the color printing ink applied to the outside of the DI can. Therefore, the use of the copolyester resin film having a melting temperature below 190° C. is also not suitable in the present invention.

Furthermore, the orientation and mechanical properties of the copolyester resin film are also very important factors from the viewpoint of the formability of the copolyester resin film.

Namely, in the copolyester resin film used in the present invention, the orientation coefficient which is defined as the degree of the orientation of the copolyester resin should be in the range of 0 to 0.100. The orientation coefficient defined above is determined by a refraction meter and is shown by the following equation in the present invention $$A = (B+C)/2 - D$$

where,

A represents the orientation coefficient of the copolyester resin film,

B represents the index of refraction in the lengthwise direction of the copolyester film, C represents the index of refraction in the widthwise direction of the copolyester resin film, D represents the index of refraction in the thickness direction of the copolyester resin film.

If the copolyester resin film having above 0.100 of the orientation coefficient is applied to the steel sheet according to the present invention, many cracks arise in the copolyester resin film laminated to the steel sheet after forming into the DI can, because the formability of this copolyester resin film becomes remarkably poor.

In the present invention, an elongation at break and a strength at break of the employed copolyester resin film, which are determined at the speed of 100 mm/min. at 25° C. in an ordinary tensile testing machine, should be in the range of 150 to 500% and 3 to 18 kg/mm², respectively. If the copolyester resin film having below 150% of elongation at break is used in the present invention, many cracks arise in the copolyester resin film after forming into DI cans, because the formability of this copolyester resin film becomes remarkably poor. On the other hand, if the copolyester resin film having above 500% of elongation at break is used in the present invention, this film is easily damaged by severe forming because the thickness of this copolyester resin film becomes non-uniform during production of this film from the extruder.

The copolyester resin film having above 18 kg/mm² of strength at break is poor in formability and the bonding strength to the steel sheet covered with hydrated chromium oxide. Therefore, if this copolyester resin film is used in the present invention, this film is easily peeled off from the surface of the steel sheet with many cracks. On the other hand, if the copolyester resin film having below 3 kg/mm² of the strength at break is used in the present invention, this copolyester resin film is easily damaged by scratches in the process for making DI cans, because this film has poor toughness.

In the present invention, the copolyester resin film selected by various restrictions described above is laminated on the steel sheet by the following two methods. The first method comprises laminating a copolyester resin film which has been precoated with a small amount of resin composite to a steel sheet. The second method comprises laminating a copolyester resin film directly to a steel sheet which is heated to the same melting temperature ±50° C. as in the first method.

In the first method, the copolyester resin film which has been precoated with 0.1 to 5 g/m² of a resin composite is laminated to a steel sheet which is heated to a melting temperature of said copolyester resin film ±50° C..

At below 0.1 g/m² of the resin composite, the bonding strength of the copolyester resin film to the steel sheet in the body wall of the formed DI can becomes unstable because the resin composite is not precoated uniformly and thinly to said copolyester resin film.

At above 5.0 g/m² of the resin composite, the copolyester resin film in the body wall of the formed DI ca is easily peeled off from the surface of the steel sheet.

Furthermore, if the heating temperature of the steel sheet is below the melting temperature −50° C., said polyester resin film is easily peeled off from the surface of the steel sheet or an interface between copolyester resin film and resin composite layer after forming into DI cans.

In the case of the melting temperature of said copolyester resin film +50° C. in the heating temperature of the steel sheet, the body wall of the obtained DI can is remarkably corroded because said copolyester resin film deteriorates by heating at higher temperature.

In the second method, the copolyester resin film is directly laminated on the steel sheet which is heated to the same melting temperature ±50° C. as in the first method. If the heating temperature of the steel sheet is below the melting temperature −50° C. of said copolyester resin film, said copolyester resin film laminated on the steel sheet is easily peeled off after forming into a DI can, and if the temperature of the heated steel sheet is above the melting temperature of said copolyester resin film +50° C., the body wall of the obtained DI can is easily corroded because said copolyester resin film deteriorates by heating at higher temperature as in the first method.

In the first method and the second method of the present invention, it is desirable that the copolyester resin film laminated steel sheet be rapidly cooled compared with gradual cooling, because said copolyester resin film is slightly recrystallized in the cooling stage from the higher temperature than the melting temperature of said copolyester resin film.

Especially, the presence of the resin composite between said copolyester resin film and the steel sheet prevents the growth of filiform corrosion at a severely formed part, while the formed DI can is kept at an atmosphere having higher temperature and higher humidity for long time before the contents such as a carbonated beverage is packed into the formed DI can. Therefore, the copolyester resin film laminated steel sheet by the first method is preferable to that by the second method.

In the present invention, a surface treated steel sheet having at least hydrated chromium oxide is used. Especially, the presence of an optimum amount of hydrated chromium oxide in the one side of the steel sheet wherein the copolyester resin film is laminated is indispensable in order to obtain an excellent adhesion of the steel sheet to the copolyester resin film or the resin composite. The optimum range for the amount of hydrated chromium oxide as chromium is 0.005 to 0.050 g/m², preferably 0.010 to 0.030 g/m² on said metal sheet.

If the amount of hydrated chromium oxide as chromium is below 0.005 g/m² or above 0.050 g/m², the adhesion of the copolyester resin film may become poor in a severely formed part.

Furthermore, where excellent corrosion resistance is required inside the obtained DI can, the steel sheet covered with tin under the hydrated chromium oxide layer should be used for the copolyester resin film laminated steel sheet according to the present invention.

The optimum range for the amount of plated tin is 0.01∼10.0 g/m².

If the amount of tin is below the lower limit, the effect of tin on the corrosion resistance in the inside of the DI can is very small.

On the other hand, the deposition of tin above the upper limit is not suitable from the viewpoint of economy, as the corrosion resistance in the inside of the DI can is not remarkably improved.

On the one hand, one side of the steel sheet for the outside of the DI can should be plated with ductile tin to fulfill the excellent lubricating effect under the ironing process.

The optimum range for the amount of tin should be controlled at 0.5 to 11.2 g/m². If the amount of tin is below the lower limit, the formability into DI cans becomes remarkably poor. The deposition of tin of above the upper limit is not suitable from the viewpoint of economy, although the formability does not change.

The surface of the plated ductile tin may be chemically treated by chromate or phosphate solution by electrolytical methods, immersion or spray methods, if these treatments have no bad effects on the formability of the DI can.

The present invention is explained in further detail by reference to the following examples.

EXAMPLE 1

0.5 g/m of tin was electrodeposited on the one side of the steel strip having a thickness of 0.30 mm and a temper of T-2.5 and 2.8 g/m² of tin was electrodeposited on the other side of said steel strip by using a known tin-plating electrolyte. After rinsing with water, 0.006 g/m² of hydrated chromium oxide film as chromium was formed on said tin plated steel strip by a known electrolytic chromic acid treatment and then rinsed with water and dried.

The obtained tin plated steel strip was heated to 220° C. by using a roll heater and then a biaxially oriented copolyester resin film produced from a condensation of ethylene glycol and polycarboxylic acid consisting of 80 mole % of terephthalic acid and 20 mole % of isophthalic acid having a thickness of 25 μm, softening temperature of 176° C., melting temperature of 215° C., elongation at break of 330%, strength at break of 8.2 kg/mm² and orientation coefficient of 0.024 was laminated on one side having 0.5 g/m² of tin on said steel strip. After that, said copolyester resin film laminated steel strip was rapidly quenched and then dried.

The thus copolyester resin film laminated steel strip was formed into a DRD can and a DI can in which the copolyester resin film was laminated to the inside of the can under the following conditions, respectively:
(Forming conditions of a DRD can)
  1. Diameter of sample blank: 140.0 mm
  2. Drawing ratio in the first drawing: 1.61
  3. Drawing ratio in the redrawing: 1.33

(Forming conditions of a DI can)
1. Diameter of sample blank: 123.5 mm
2. Drawing ratio in the first drawing: 1.82
3. Drawing ratio in the second redrawing: 1.29
4. Diameter of an ironing punch: 52.64 mm
5. Total ironing ratio: 64%

EXAMPLE 2

A copolyester resin film produced from a condensation of ethylene glycol and polycarboxylic acid consisting of 85 mole % of terephthalic acid and 15 mole % of isophthalic acid having a thickness of 30 μm, softening temperature of 192° C., melting temperature of 239° C., elongation at break of 210%, strength at break of 12.3 kg/mm$^2$ and orientation coefficient of 0.065, which is precoated with 0.2 g/m$^2$ (drying weight) of a resin composite consisting of 80 parts of epoxy resin having an epoxy equivalent of 3000 and 20 parts of resol of paracresol type, was laminated on the one side having 0.5 g/m$^2$ of tin of the same tin plated steel strip as in Example 1 which was heated to 220° C., and then was rapidly quenched and dried.

The thus copolyester resin film laminated steel strip was formed into a DRD can and a DI can under the same conditions as in Example 1.

COMPARATIVE EXAMPLE 1

0.5 g/m$^2$ of tin was electroplated on both sides of the same steel strip and in the same way as in Example 1 after rinsing with water, a film consisting of a lower layer of 0.03 g/m$^2$ of metallic chromium and an upper layer of 0.007 g/m$^2$ of hydrated chromium oxide as chromium was formed on said both sides of tin plated steel strip by a known electrolytic chromic acid treatment, followed by rinsing with water and drying.

A biaxially oriented polyethylene terephthalate film having a thickness of 25 μm, softening temperature of 242° C., melting temperature of 260° C., elongation at break of 131%, strength at break of 23.2 kg/mm$^2$ and orientation coefficient of 0.147 was laminated on the one side of the tin plated steel strip having a double layer consisting of a lower layer of metallic chromium and an upper layer of hydrated chromium oxide as chromium, which was heated to 290° C. by using a roll heater and then was rapidly quenched and dried.

The thus polyethylene terephthalate film laminated steel strip was formed into a DRD can and a DI can under the same conditions as in Example 1.

COMPARATIVE EXAMPLE 2

The same copolyester resin film as EXAMPLE 1 was laminated on the one side of the same tin plated steel strip as in COMPARATIVE EXAMPLE 1 in the same laminating conditions as in EXAMPLE 1.

The thus copolyester resin film laminated steel strip was formed into a DRD can and a DI can under the same conditions as in EXAMPLE 1.

The characteristics of the resultant DRD can and DI can was evaluated by the following methods.

The results are shown in the Table.

(1) The formability of polyester resin film laminated steel strip into a DRD can and DI can.

It was evaluated by the continuous formability, the adhesion of the resin film after the forming and the external appearance of the formed DRD can and DI can.

(2) Degree of exposed metal in the inside of formed DRD can or DI can.

After a 1% NaCl solution was filled in the DRD can or the DI can, the degree of the exposed metal was evaluated by a current value which flowed between an anode of a can body and a cathode of a stainless steel rod inserted in the can at a constant voltage of 6.3 volt.

(3) Filiform corrosion during storage.

The filiform corrosion which grows near the flange parts in the inside of the DI can was evaluated after storage for 3 months at a relative humidity of 92% at 27° C..

(4) Degree of cracks of polyester resin film in the flange part after seaming.

A lacquered aluminum lid was double-seamed to the DI can. The degree of cracks of polyester resin film in the flange part near the seaming part was observed after removing the seamed aluminum lid.

(5) Corrosion resistance by pack test.

A lacquered aluminum lid was double-seamed after Coca Cola was filled in the DI can. After the storage for 3 months at 37° C., the degree of corrosion was observed by naked eye with measurement of iron pick up.

The obtained respective result was divided into 5 ranks, namely 5 was excellent, 4 was good, 3 was fair, 2 was poor, and 1 was bad.

TABLE

| | | | EX. 1 | EX. 2 | Comp ex. 1 | Comp ex. 2 |
|---|---|---|---|---|---|---|
| Coating weight on the one side of the steel strip to be inside of the formed can (g/m$^2$) | | | Sn 0.5<br>Cr$^{ox}$ 0.006 | Sn 0.5<br>Cr$^{ox}$ 0.006 | Sn 0.5<br>Cr$^o$ 0.03<br>Cr$^{ox}$ 0.007 | Sn 0.5<br>Cr$^o$ 0.030<br>Cr$^{ox}$ 0.007 |
| Coating weight on the one side of the steel strip to be outside of the formed can (g/m$^2$) | | | Sn 2.8<br>Cr$^{ox}$ 0.006 | Sn 2.8<br>Cr$^{ox}$ 0.006 | Sn 0.5<br>Cr$^o$ 0.030<br>Cr$^{ox}$ 0.007 | Sn 0.5<br>Cr$^o$ 0.030<br>Cr$^{ox}$ 0.007 |
| Characteristics of employed copolyester resin film | | Softening temp. (°C.) | 176 | 192 | 242 | 176 |
| | | Melting temp. (°C.) | 215 | 239 | 260 | 215 |
| | | Orientation coefficient | 0.024 | 0.065 | 0.147 | 0.024 |
| | | Elongation at break (%) | 330 | 210 | 131 | 330 |
| | | Strength at break (kg/mm$^2$) | 8.2 | 12.3 | 23.2 | 8.2 |
| Characteristics of employed copolyester resin film | DRD | Continuous formability | 5 | 5 | 5 | 5 |
| | | Adhesion after forming | 5 | 5 | 5 | 5 |
| | | External appearance | 5 | 5 | 5 | 5 |
| | | Metal Exposure (mA) | 0 | 0 | 0 | 0 |
| | DI | Continuous formability | 5 | 5 | 1 | 2 |
| | | Adhesion after forming | 5 | 5 | 4 | 5 |
| | | External appearance | 5 | 5 | 1 | 2 |
| | | Metal Exposure (mA) | 0.01 | 0.02 | 15.8 | 0.01 |
| | | Filiform Corr. resistance | 4 | 5 | 2 | 4 |
| | | Cracks by seaming | No | No | Many | No |

TABLE-continued

|  | EX. 1 | EX. 2 | Comp ex. 1 | Comp ex. 2 |
| --- | --- | --- | --- | --- |
|  | crack | crack | micro cracks | crack |
| Iron pick up (ppm) | 0.05 | 0.42 | 3.23 | 0.07 |
| Corr. by pack test | Good | Good | Pitting | Good |

Remarks
*$Cr^o$ represents metallic chromium and $Cr^{ox}$ represents chromium in hydrated chromium oxide.

As shown in the Table, it is clear that the DI process is a far more severe forming process than that of DRD, and the resin film laminated steel sheet capable of being formed into a DRD can is not always able to be formed into a DI can.

The polyethylene terephthalate film of COMPARATIVE EXAMPLE 1 had insufficient ductility for the DI process, consequently many cracks were generated in the film under the ironing process and the metal exposure inside the can resulted in a poor level.

Moreover, the polyethylene terephthalate has a melting temperature of 260° C., so the tin plated steel sheet to be laminated with that film must be heated to the temperature of 290° C. in order to have superior adhesion, accordingly, tin, 0.5 g/m² of which was plated on the steel sheet and has melting temperature of 232° C., entirely melted and alloyed into a hard and brittle iron-tin alloy, and a triple layer consisting of an uppermost layer of hydrated chromium oxide, an intermediate layer of metallic chromium and a lowermost layer of iron-tin alloy was left on the one side of the steel sheet to be the outer side of a DI can after the laminating process.

It is known that hydrated chromium oxide, 0.007 g/m² of which exists as an uppermost layer on the steel sheet, does not have a bad influence on the lubricating effect under the ironing process in such a small amount in the case that it exists on the free tin layer of a tin plate for DI can; however, metallic chromium, 0.03 g/m² of which exists as an intermediate layer, is hard and lacking in ductility and iron-tin alloy, which exists as a lowermost layer, is also lacking in ductility as mentioned earlier.

Therefore, there was no layer having lubricating capacity under the ironing process left on the one side of the steel sheet to be the outer side of DI can, consequently COMPARATIVE EXAMPLE 1 was able to be formed into a redrawn cup, but only a few redrawn cups could be ironed under the continuous DI process.

On the other hand, since the copolyester resin film of EXAMPLE 1, EXAMPLE 2 and COMPARATIVE EXAMPLE 2 has excellent ductility for the DI process, no crack was generated in the film under the ironing process and the metal exposure inside the can resulted in an excellent level.

In addition, the copolyester resin film of EXAMPLE 1 and COMPARATIVE EXAMPLE 2 has a melting temperature of 215° C., so the tin plated steel sheet to be laminated with that film had only to be heated to the temperature of 220° C., which is below the melting temperature of tin, accordingly, free tin having excellent ductility and lubricating capacity under the ironing process was left on the one side of the steel sheet to be the outer side of the DI can after the film laminating process.

However, in the case of COMPARATIVE EXAMPLE 2, the same upper layer of hydrated chromium oxide and lower layer of metallic chromium as those of COMPARATIVE EXAMPLE 1 were formed on the tin plated steel sheet, so the metallic chromium being hard and lacking in ductility badly influenced the lubricating effect under the ironing process, and only several hundred cans could continuously be ironed due to the accumulation of the hard and micro fragments of metallic chromium on the ironing dies, which roughened the surface of dies. Moreover, the external appearance of DI cans made according to COMPARATIVE EXAMPLE 2 was inferior to that made according to EXAMPLE 1 due to the ironing with the roughened ironing dies having accumulated micro fragments of metallic chromium thereon.

We claim:

1. A polyester resin film laminated steel sheet or strip for a drawn and ironed can, one side of which is to be used for the inside of said drawn and ironed can and the opposite side of which is to be used for the outside of said can,
    said one side being laminated to form a triple layer consisting of:
    an uppermost layer of copolyester resin film having a thickness of 10 to 50 μm, a softening temperature of 170 to 235° C., a melting temperature of 190 to 250° C., an elongation at break of 150 to 500%, strength at break of 3 to 18 kg/mm², and a degree of orientation between 0 to 0.100,
    an intermediate layer of hydrated chromium oxide and
    a lowermost layer of tin, and
    said opposite side being covered with a layer of tin.

2. The polyester resin film laminated steel sheet or strip according to claim 1 wherein said one side of said copolyester resin film to be laminated to said steel sheet or strip has been precoated with 0.1 to 5 g/m² of a resin composite.

3. The polyester resin film laminated steel sheet or strip according to claim 1 wherein the amount of said hydrated chromium oxide which forms said intermediate layer between said uppermost layer of said copolyester resin film and said lowermost layer of tin on said one side of said steel sheet or strip contains 0.005 to 0.050 g/m² as chromium.

4. The polyester resin film laminated steel sheet or strip according to claim 1 wherein said lowermost layer which directly covers the side of said steel sheet or strip to be used for the inside of said drawn and ironed can contains an amount of 0.01 to 10.0 g/m² of tin.

5. The polyester resin film laminated steel sheet or strip according to claim 1 wherein said layer which covers the side of said steel sheet or strip to be used for the outside of said drawn and ironed can contains an amount of 0.5 to 11.2 g/m² of tin.

* * * * *